(12) United States Patent
Mednikov et al.

(10) Patent No.: US 6,462,536 B1
(45) Date of Patent: Oct. 8, 2002

(54) EDDY CURRENT SENSOR

(75) Inventors: Felix Mednikov, Samara (RU); Karl Wisspeintner, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 09/446,034

(22) PCT Filed: Jun. 22, 1998

(86) PCT No.: PCT/DE98/01709

§ 371 (c)(1),
(2), (4) Date: Dec. 15, 1999

(87) PCT Pub. No.: WO98/59216

PCT Pub. Date: Dec. 30, 1999

(30) Foreign Application Priority Data

Jun. 21, 1997 (DE) ......................................... 197 26 348
Nov. 27, 1997 (DE) ......................................... 197 52 497

(51) Int. Cl.⁷ .............................. G01B 7/14; G01D 5/20
(52) U.S. Cl. .............................. 324/207.16; 324/207.24
(58) Field of Search ........................ 324/207.11, 207.13, 324/207.16, 207.24, 207.25; 73/313; 336/200, 45

(56) References Cited

U.S. PATENT DOCUMENTS 4,006,637 A * 2/1977 Kinosita ..................... 73/313
5,629,619 A 5/1997 Mednikov

FOREIGN PATENT DOCUMENTS

DE 42 25 968 A 2/1994

OTHER PUBLICATIONS

Patent Abstracts of Japan, vol. 17, No. 399 (P–1579), Jul. 26, 1993 & JP 05 072166 A (Mitsubishi Electric Corp), Mar. 23, 1993.

* cited by examiner

*Primary Examiner*—Walter E. Snow
(74) *Attorney, Agent, or Firm*—Alston & Bird LLP (57) ABSTRACT

Eddy current sensor with an exploring coil (2) wound on a coil form (32), with two terminals (6, 7), a source of ac voltage, an electrically conductive measuring probe (3), and an evaluation circuit, wherein the measuring probe (3) is displaceable relative to the exploring coil (2), and the evaluation circuit generates an evaluation signal as a function of the position of the measuring probe (3), wherein the eddy current sensor comprises an electrode (4) with a tap (8) for enabling electrical contact, the electrode forming together with the windings of the exploring coil (2) and an intermediate layer (33) a component with distributed electromagnetic parameters, whose output signals are used to determine the position of the measuring probe (3).

21 Claims, 11 Drawing Sheets

EDDY CURRENT SENSOR

BACKGROUND OF THE INVENTION

The invention relates to an eddy current sensor with an exploring coil wound on a coil form, with two terminals, a source of ac voltage, an electrically conductive measuring probe, and an evaluation circuit, wherein the measuring probe is displaceable relative to the exploring coil, and the evaluation circuit generates an evaluation signal as a function of the position of the measuring probe.

An eddy current sensor of the described type is disclosed in U.S. Pat. No. 5,629,619. For evaluating the position of the measuring probe, a plurality of voltage taps are provided. The different potentials applied to the voltage taps are supplied to an evaluation circuit. The measuring probe arranged between two voltage taps each influences the partial impedance of the corresponding coil section and, thus, the potential on the voltage taps. With the aid of the evaluation circuit, it is therefore possible to determine the position of the measuring object with respect to the voltage taps. However, this arrangement involves the disadvantage that the ratio of the measuring range to the length of the sensor is dependent on the number of voltage taps. To obtain a measuring range as large as possible with respect to finding the position of the measuring probe, it is necessary to have a large number of voltage taps of the exploring coil, which increases the complexity of the measuring sensor. At the same time, it is also necessary to adapt the length to the measuring probe, which is dependent on the spacing of the voltage taps.

It is therefore the object of the present invention to improve an eddy current sensor of the initially described kind such that a simple construction of the eddy current sensor permits realizing a greatest possible ratio O)f the measuring range to the length of the sensor with respect to measuring the position of the measuring probe.

A further object of the invention is that the sensor exhibits a satisfactory temperature stability.

SUMMARY OF THE INVENTION

The above and other objects and advantages of the present invention are achieved by the provision of an eddy current sensor which comprises an electrode with a tap for enabling electrical contact. The electrode forms together with the windings of the exploring coil and an intermediate electrically insulating layer a component with distributed electromagnetic parameters, i.e. complex impedances, whose output signals are used to determine the position of the measuring probe.

According to the invention, the eddy current sensor has therefore both inductive and resistive as well as capacitive components. While the measuring probe influences only that part of the exploring coil, which it covers, the impedance of the exploring coil as a whole is independent of the position of the measuring probe. In this connection, the extension of the measuring probe parallel to the coil axis may be very small, theoretically infinitely small.

It is therefore possible to make available a high-resolution eddy current sensor with a ratio as high as 90% between the measuring range and the length of the sensor, with only two terminals on the exploring coil and a further tap of the electrode. The two terminals are connected in particular indirectly, i.e., by means of wiring, or directly to the terminals of a source of ac voltage.

The simple construction of the eddy current sensor makes it possible to produce it in a cost-favorable manner. It has only three terminals for contacting respectively the voltage supply and the evaluation circuit. Consequently, it is possible to make the eddy current sensor even more compact, since the width of the measuring probe may be very small, and the exploring coil may also have a smaller length in the axial direction. Moreover, the dimensions of the measuring probe influence the measuring result to a lesser extent than in the solution with the voltage taps. As a result, the eddy current sensor of the present invention is also very suitable for miniaturization.

It is preferred to construct the intermediate layer as an electrode, as a conductor, or a printed circuit board, and to arrange it parallel to the axis of the exploring coil. The parallel arrangement generates an impedance with inductive, capacitive, and ohmic resistance components, with the capacitive component being formed between the intermediate layer and the windings of the exploring coil. In connection with an axis parallel displacement of the measuring probe, the component with distributed electromagnetic parameters is also influenced in ranges arranged parallel to the axis of the exploring coil, which leads to output signals that can be used for a simple evaluation by an evaluation circuit.

In a further development of the invention, the entire coil form is made an electrode and consists of a material with little electric resistance, in particular a ferromagnetic material. This makes it possible to produce on the one hand the coil form in a simple shape from uniform material, and, advantageously, the electrode has a particularly large surface. The coil form may be designed and constructed as a tubular component.

An intermediate layer is arranged between the windings of the exploring coil and the coil form. This intermediate layer may be applied to the surface of the coil form. As a result of the material properties and the geometry of the intermediate layer (electric conductivity "$\delta$", relative permittivity "$\epsilon$", thickness), the transition resistance is variable between the windings of the exploring coil and the electrode.

In this connection, the exploring coil may be wound from insulated or bare wires. If bare wires are used, the windings will have to be wound in a certain spaced relationship between one another.

In another further development of the invention, the insulating layer of the winding wire is used as intermediate layer between the coil form and the electrode. In this instance, the capacitive component of the eddy current sensor dominates, since the ohmic resistance of the intermediate layer is very high.

However, if the ohmic component R is smaller than the capacitive component C of the intermediate layer and, thus, substantially greater than the impedance of the exploring coil $\dot{Z}_I$ per unit of length, the output signal will depend substantially on the ohmic component R.

In another advantageous further development of the invention, the coil form is an insulator, and a casing surrounding the exploring coil forms the electrode. In this arrangement, the casing may be made from a conductive, nonferromagnetic material, in particular a stainless steel. In particular in connection with a measuring probe extending inside the coil form, it is thus possible to produce a compact and encapsulated eddy current sensor. The intermediate layer may comprise a complex transition resistance between the windings of the exploring coil and the electrode with a negative or positive temperature coefficient. This permits compensating the temperature influence on the output signal of the eddy current sensor.

Preferably, the electric resistance value of the electrode per unit of length is much greater than the resistance value of the measuring probe per unit of length. This permits influencing the eddy current effects in the electrode and measuring probe in a purposeful manner.

The measuring probe is an electrically conductive ring surrounding the exploring coil and adapted for noncontacting displacement on the outer surface of the exploring coil along the axis thereof. However, the measuring probe may also be arranged for displacement inside the coil form in a channel extending parallel to the coil axis. The measuring probe thus extends protected inside the exploring coil, and it may be constructed very small. In this connection, the measuring probe may also be part of a measuring object or be the measuring object itself. In the last-mentioned case, it is possible to use particles arranged inside a tubular coil form to form a measuring probe.

In a particularly preferred embodiment, the electrode, intermediate layer, and coil form are each aligned with their longitudinal axes parallel to the axis of the exploring coil, and/or the deflection of the measuring probe occurs parallel to the axis of the exploring coil. This forms a simple, linear arrangement, which generates easy-to-evaluate output signals for an evaluation circuit.

In another preferred further development of the invention, the coil form forms a closed ring, if need be, with the electrode, and the measuring probe is supported for displacement along the ring. In this connection, the measuring probe may again form a ring surrounding the coil form and the exploring coil, or be supported in a channel inside the coil form. This embodiment is especially suitable for detecting angular changes, which are performed by a measuring object that is connected to the measuring probe.

In a preferred further development of the invention, both terminals of the exploring coil connect to a source of ac voltage, and the evaluation circuit comprises an operation amplifier, whose input connects to the tap of the electrode. In accordance with the invention, the inverting input of the operation amplifier may be connected to the tap of the electrode. Due to the change in the output signal on the eddy current sensor, i.e., the voltage change, the evaluation circuit detects the position or position change of the measuring probe relative to the exploring coil.

In another further development of the invention, ac voltage is applied between the tap of the electrode and the terminal of the exploring coil, and the second terminal of the exploring coil connects to an input of an operation amplifier of the evaluation circuit. Preferably, the terminal of the exploring coil connects to the inverting input of the operation amplifier. Likewise, this evaluation circuit is wired by resistors and capacitors in such a manner that it makes it possible to compare or add output voltages.

In another further development of the invention, the exploring coil comprises a further terminal, in particular in the form of a center tap of the exploring coil. The center tap connects via a low-pass filter to an inverting input of an operation amplifier. The output signal may be used for compensating the temperature gradient influence of the impedance of the eddy current sensor.

Finally, the tap of the electrode may also connect to ground. In this instance, the two terminals of the exploring coil connect, for example, to a source of ac voltage and to the input of an operation amplifier.

All components of the sensor may be miniaturized on a chip, for example, as a magnetoresistive or photoresistive structure.

BRIEF DESCRIPTION OF THE DRAWINGS

Several embodiments of the invention are shown in the drawings and described in the following. In the drawings in which each Figure is a schematic view.

DETAILED DESCRIPTION OF THE PREFERRED EMBODIMENTS

Figure 1:
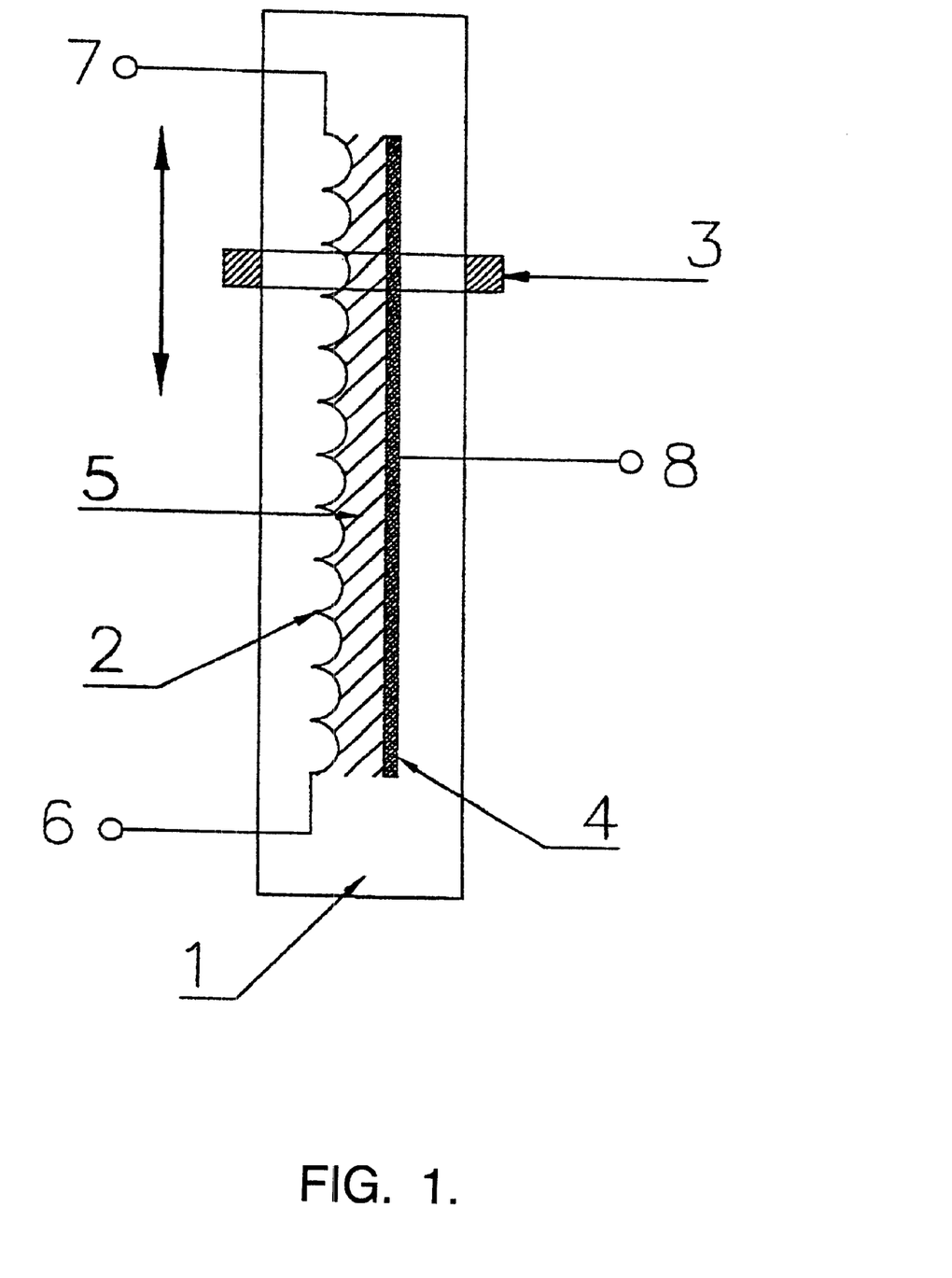
FIG. 1 is a simplified illustration of a first embodiment of the eddy current sensor according to the invention.

FIG. 1 illustrates an eddy current sensor 1 of the present invention with an exploring coil 2 and an annular measuring probe 3. The eddy current sensor 1 comprises an electrode 4 extending parallel to the axis of exploring coil 2 and an intermediate layer 5 arranged between the exploring coil 2 and electrode 4. The intermediate layer 5 consists of an insulating material that is arranged parallel to the axis of exploring coil 2 and contains a material with electromagnetic and electrically distributed parameters. The exploring coil 2 has two terminals 6 and 7 for enabling electrical contact. Likewise, the electrode 4 that is constructed as a conductor has a tap 8 to connect thereto in particular an evaluation circuit for detecting the position of measuring probe 3. The exploring coil 2 is preferably a single-layer coil, and the eddy current sensor may form a homogeneous, three-pole structure of the kind of semiconductor transistors.

Figure 2A:
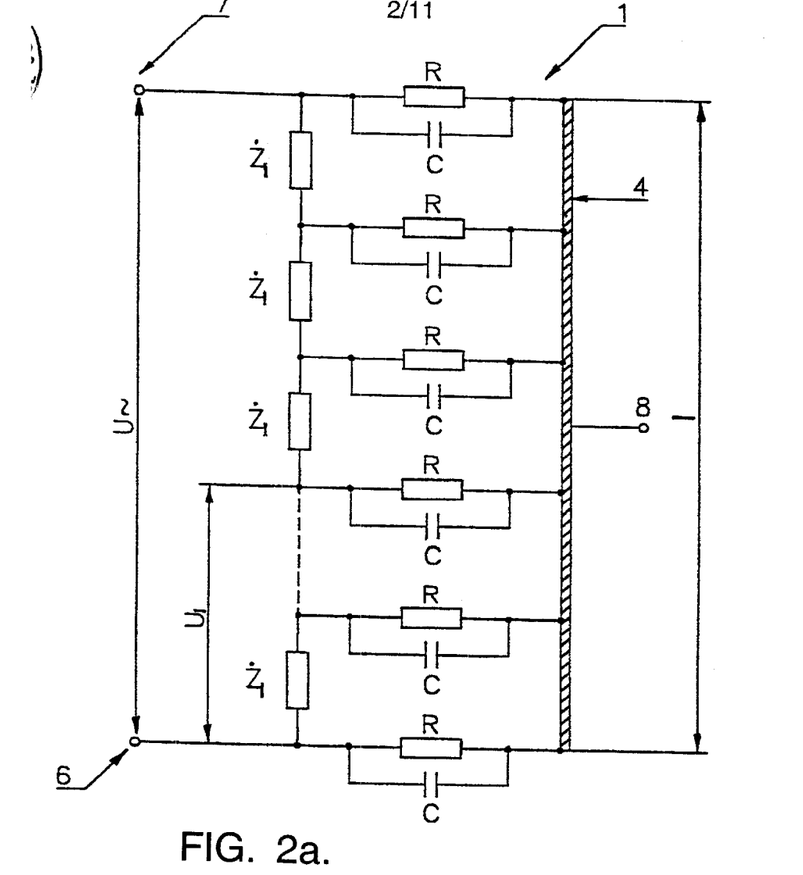
FIG. 2a is an equivalent circuit diagram of the eddy current sensor of FIG. 1.

FIG. 2a shows the electrical equivalent circuit diagram of eddy current sensor 1 with an homogeneous structure of the length 1. In this connection, it is possible to show the inductive, capacitive, and resistive components of eddy current sensor 1 with a homogeneous structure of the length 1 by a complex impedance $\dot{Z}_1$ and by a capacity C connected parallel to ohmic resistance R.

In this connection, $\dot{Z}_1$ is respectively the impedance of exploring coil 2 per unit of length, R the resistance of intermediate layer 5, i.e., the ohmic transition resistance between exploring coil 2 and electrode 4 per unit of length, and C the capacitance between exploring coil 2 and electrode 4 per unit of length.

The resistance of electrode 4 is neglected in each case, the resistance R is much greater than impedance $\dot{Z}_1$ of exploring coil 2 per unit of length, and the value $1/j\omega C$ of the capacitive component per unit of length is much greater than the impedance $\dot{Z}_1$ of exploring coil 2 per unit of length.

Figure 2B:
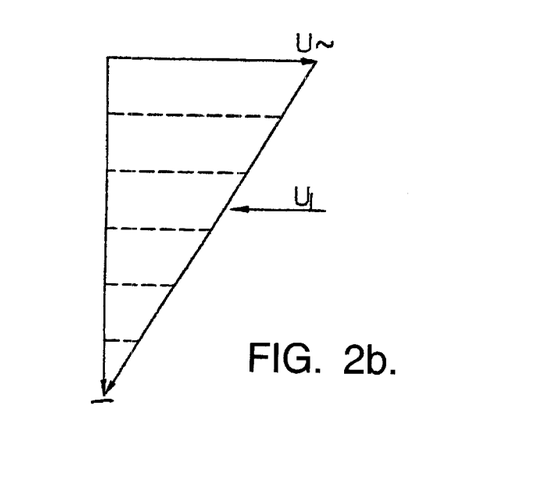
FIG. 2b is an operating diagram, which shows the change in the measuring voltage U as a function of the deflection of the exploring coil.

When the total potential $\dot{U}_\sim$ is applied between the points 6 and 7, the potential $\dot{U}_1$ changes under these conditions practically linearly along exploring coil 2. This connection is shown in FIG. 2b. Since, as shown in FIG. 2a, the ohmic component is connected parallel to the capacitive component of a homogeneous structure, either the ohmic or the capacitive component of the transition impedance between exploring coil 2 and electrode 4 dominates as a function of the material properties of intermediate layer 5 (electric conductivity δ, relative permittivity ε, spacing between the windings of exploring coil 2 and electrode 4) and the frequency.

The exploring coil 2 may be wound from insulated or bare wires. If bare wires are used, the windings will have to be wound in a certain spaced relationship.

Figure 3:
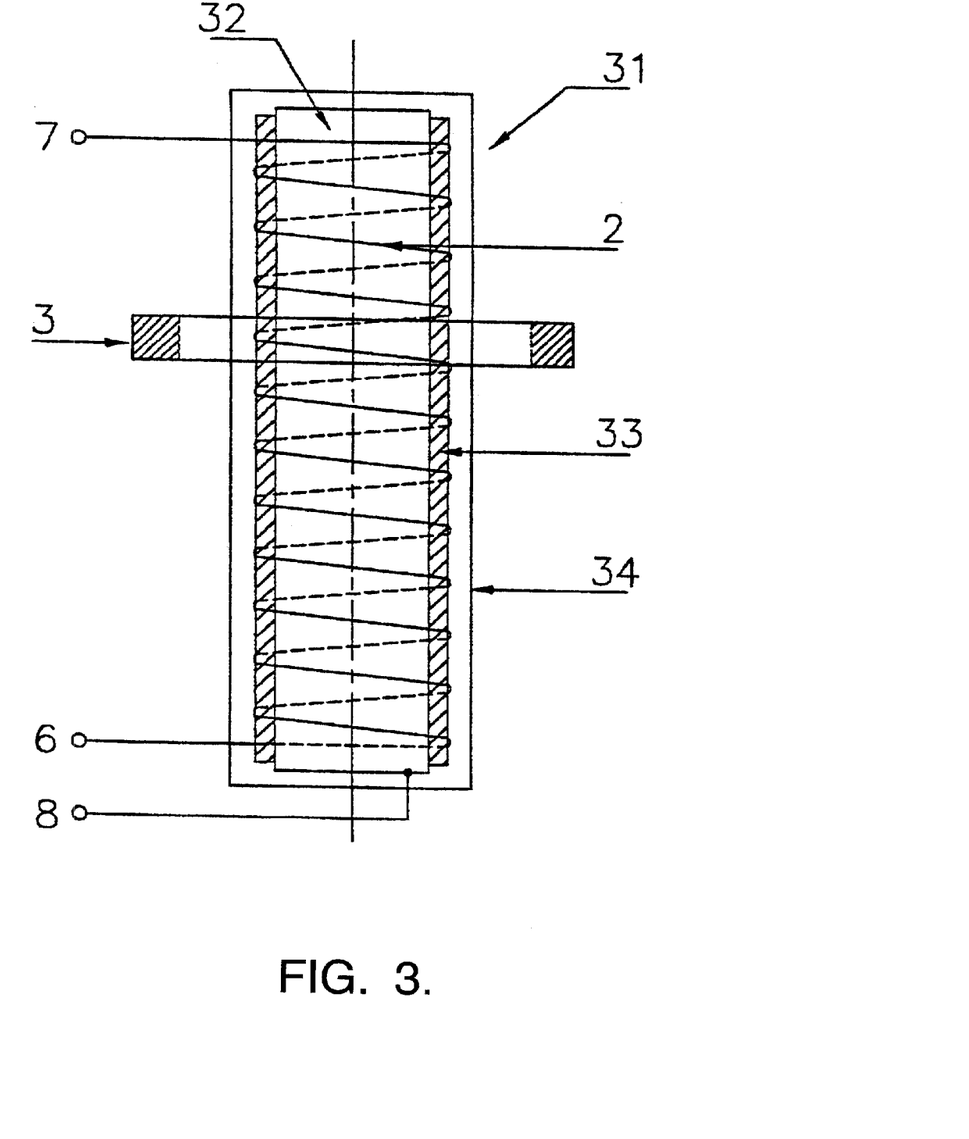
FIG. 3 is a sectional view of a second embodiment of an eddy current sensor according to the invention.

FIG. 3 illustrates the simplest embodiment of the invention. In this embodiment, the eddy current sensor 31 comprises a cylindrically constructed coil form 32 with exploring coil 2 wound thereon in a single layer. Between the outer surface of coil form 32 and the windings of exploring coil 2, an intermediate layer 33 is applied to the surface of coil form 32. The coil form 32 is made from a material with little electric resistance, for example, a ferromagnetic steel. The exploring coil 2, the coil form 32, and the intermediate layer 33 are arranged in a casing 34. The measuring probe 3 is displaceable parallel to the axis of exploring coil 2, and insulated against the windings of exploring coil 2. The coil form 32 which acts as an electrode, has a tap 8. The measuring probe 3 consists of an electrically conductive material and is made annular for generating eddy currents therein. The casing 34 may be made of plastic or a nonferromagnetic steel.

Figure 4:
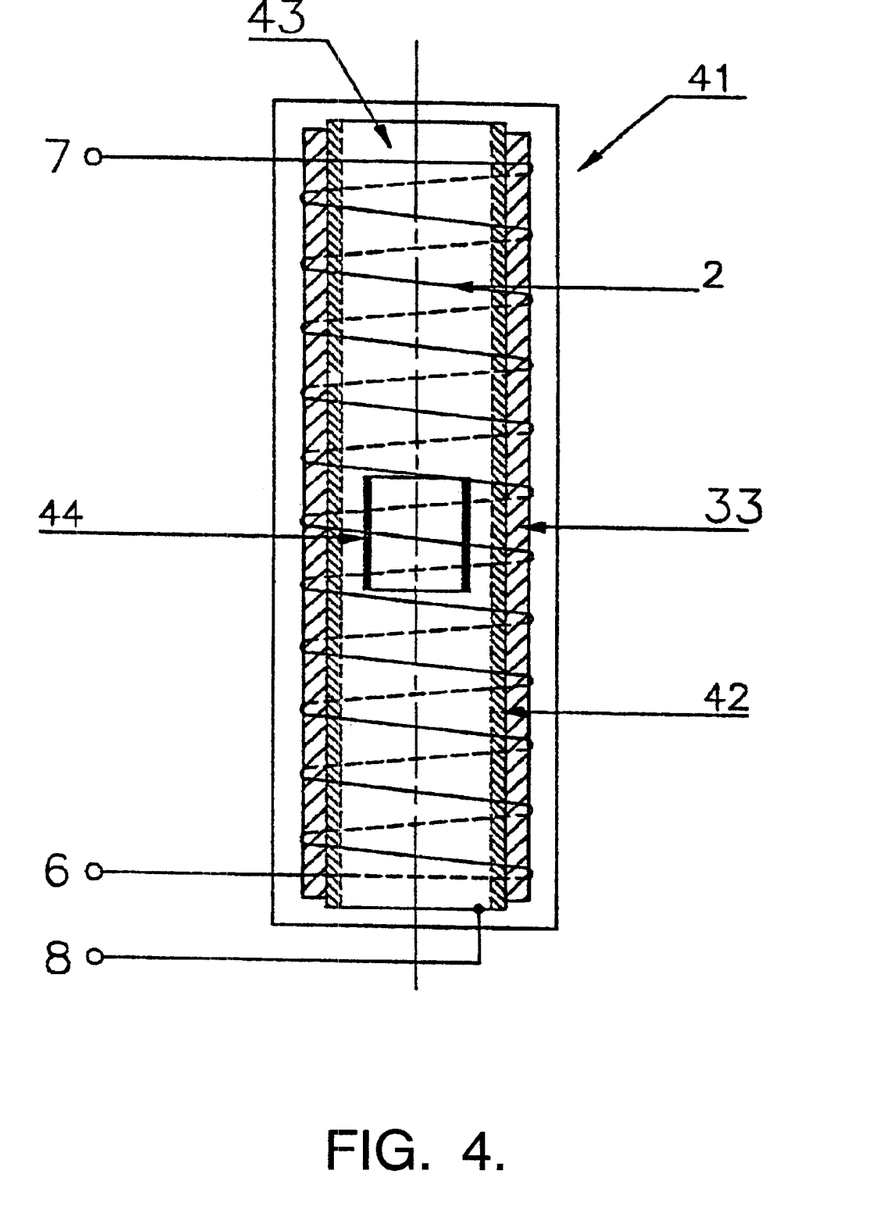
FIG. 4 is a sectional view of a third embodiment of the eddy current sensor according to the invention.

The eddy current sensor 41 shown in FIG. 4 comprises a coil form 42 made of a nonferromagnetic, stainless steel. The coil form 42 is constructed tubular and comprises in its interior a cylindrical channel 43. In the channel 43, a measuring probe 44 in the form of a ferromagnetic core is arranged for axial displacement. The intermediate layer 33 is again applied to the outer surface of coil form 42 for purposes of insulating the exploring coil 2 against the coil form 42.

Figure 5:
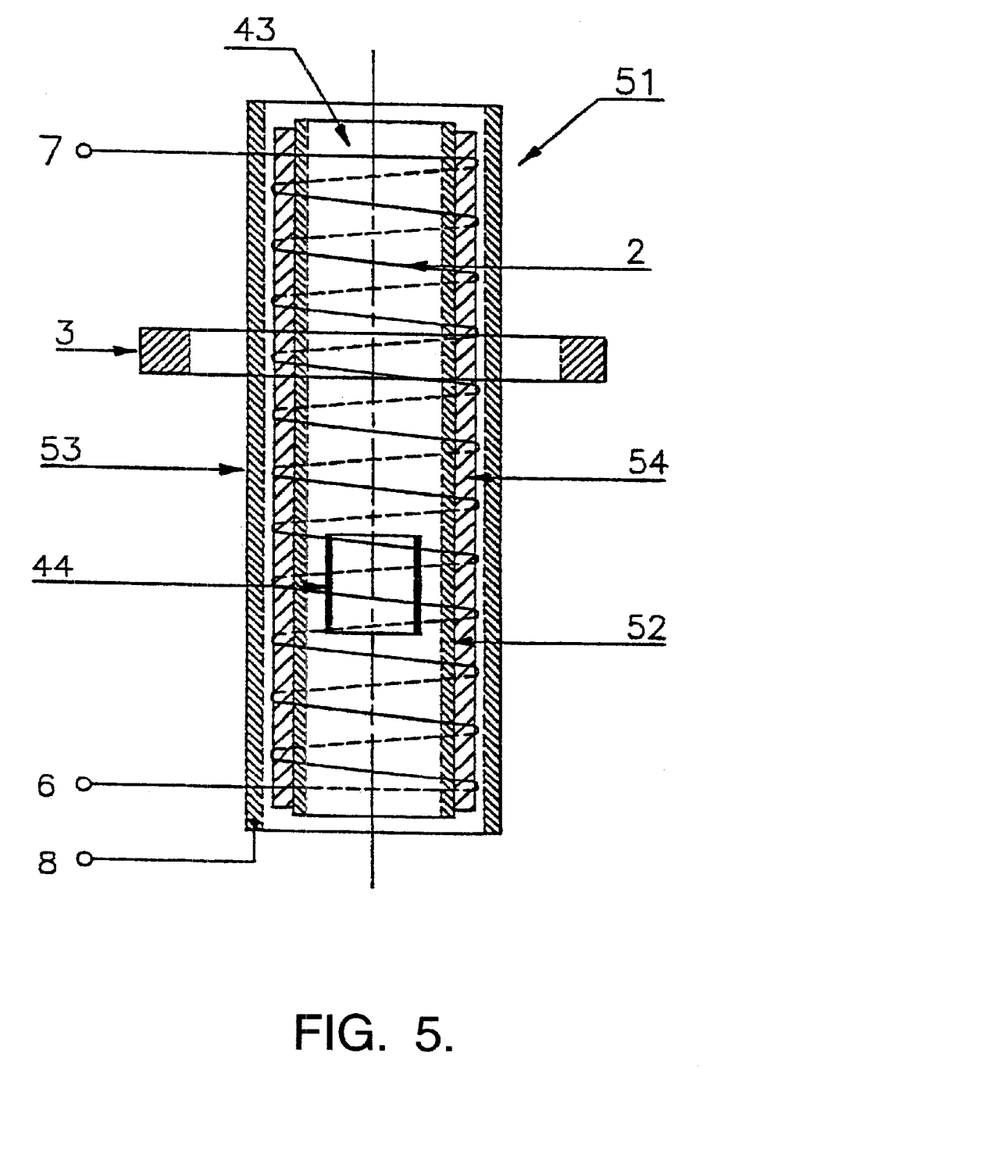
FIG. 5 is a sectional view of a fourth embodiment of an eddy current sensor of the present invention.

The eddy current sensor 51 shown in FIG. 5 comprises a nonconductive coil form 52, in particular of plastic, with an exploring coil 2 wound in a single layer on its outer surface. The exploring coil 2 is separated from an outer cylindrical casing 53 by an intermediate layer 54. The casing 53 may be made from a conductive, nonferromagnetic material, and be annularly surrounded by a first conductive measuring probe 3. As an alternative or in addition, another measuring probe 44 may extend in a channel 43 in coil form 52. In this embodiment, the casing 53 is constructed as an electrode.

Figure 6:
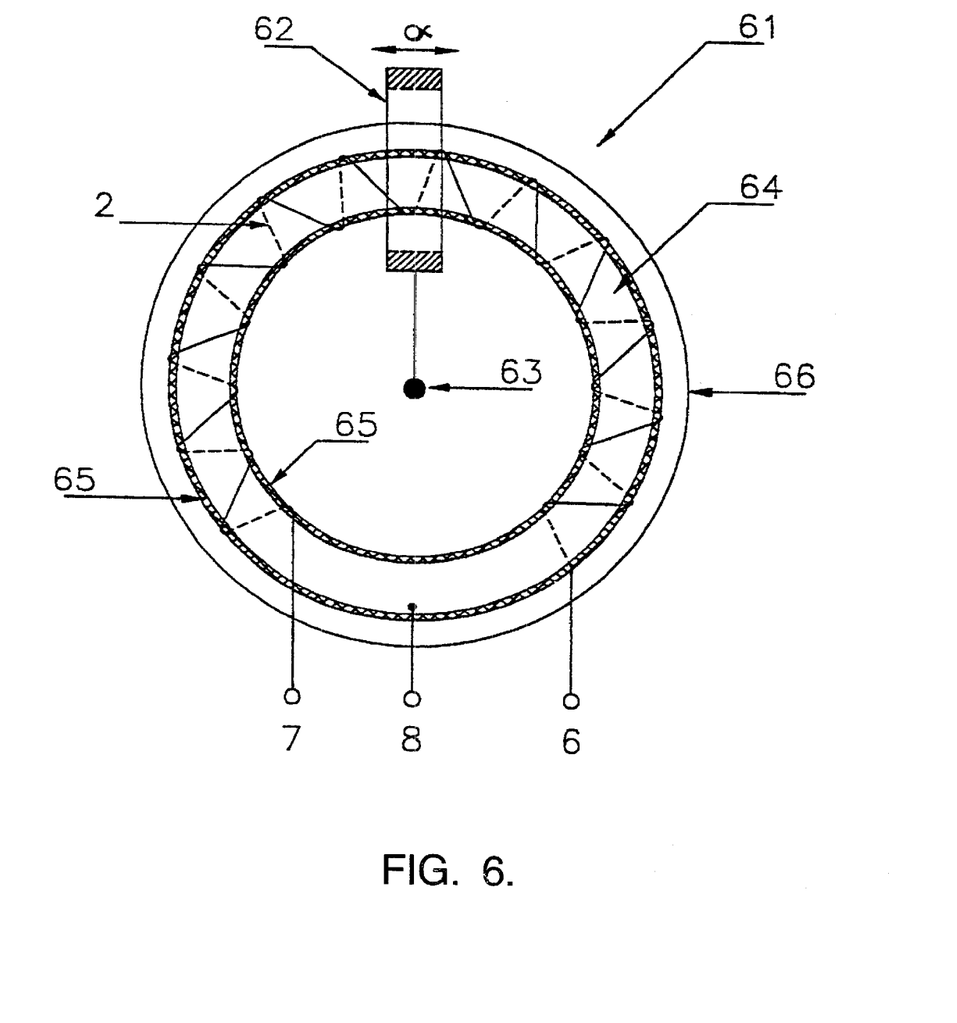
FIG. 6 is a sectional view of a fifth embodiment of an eddy current sensor according to invention for detecting changes in displacement.

The eddy current sensor 61 shown in FIG. 6 is provided for detecting angular changes of a measuring probe 62. The measuring probe 62 is supported in a bearing 63 for rotation by an angle. An exploring coil 2 is wound in a single layer on a coil form 64 of steel, and separated by an intermediate layer 65. The coil form 64 is constructed as an electrode and connected to the tap 8. The eddy current sensor 61 comprises a casing 66, which is surrounded by the annular measuring probe 62. The casing 66 consists of an insulation material.

Figure 7A:
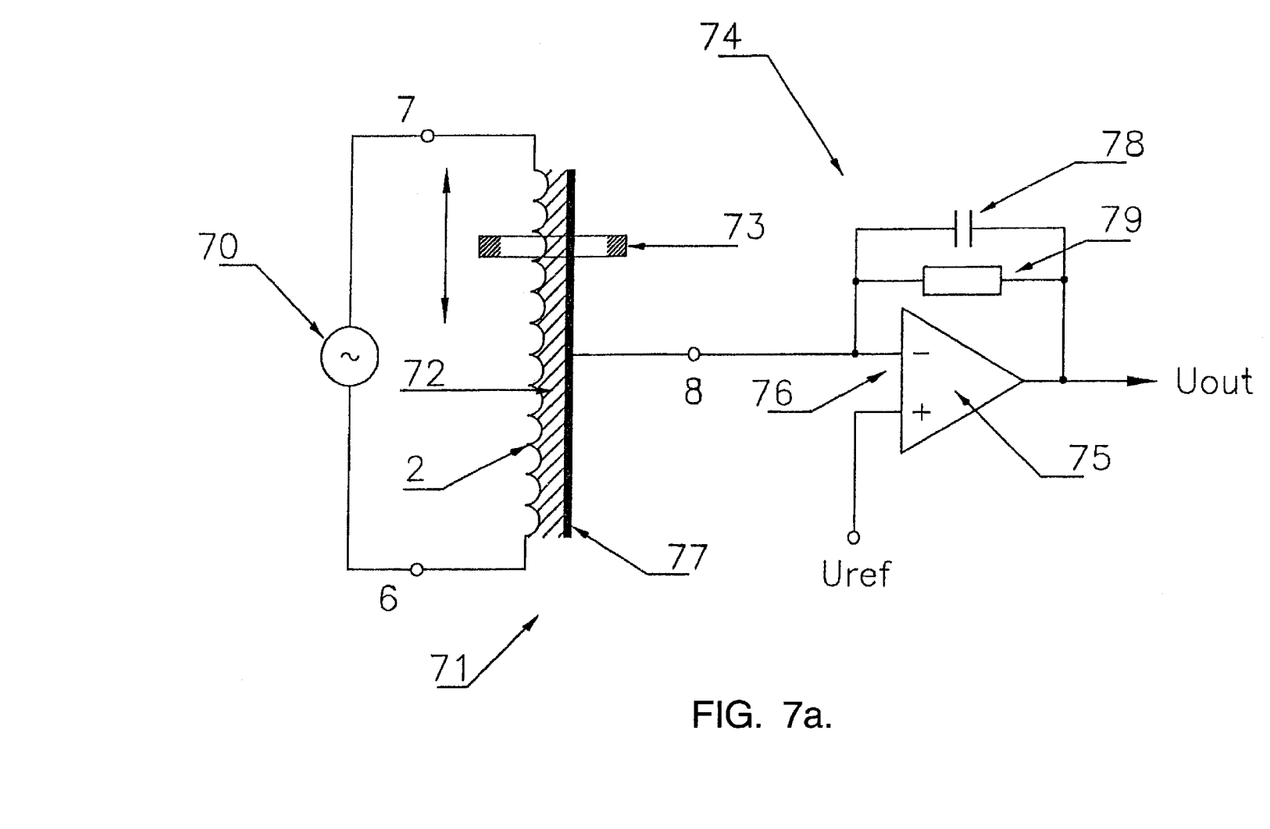
FIG. 7a shows an eddy current sensor of the present invention with a first evaluation circuit.

In FIG. 7a an eddy current sensor 71, which comprises an intermediate layer 72 and an axially displaceable measuring probe 73, is provided with an evaluation circuit 74 for detecting the position of measuring probe 73. The evaluation circuit 74 comprises an operation amplifier 75 that connects via its inverting input 76 to the tap 8 of an electrode 77. The transition impedance of the intermediate layer 72 is greater than the inductive impedance of coil 2. This causes the voltage to change linearly along the exploring coil 2 between the terminals 6 and 7. To this end, it is necessary to connect terminals 6 and 7 of exploring coil 2 to a source of ac voltage 70. The linearly variable, induced voltage is added to an output voltage $U_{out}$ via an adder of the evaluation circuit, which consists of an operation amplifier 75, a capacitor 78, and a resistor 79. In the evaluation circuit 74, the addition of the voltage values $U_e$ is performed with an adding operation amplifier 75. The potential of the inverting input 76 of operation amplifier 75 is zero. This means that the voltage values $U_1$ can be added independently of one another.

When the exploring coil 2 is supplied with two voltages that are complementary to each other, i.e., symmetrical to the reference potential $U_{ref}$, and when the measuring probe 73 is in the center of exploring coil 2, $U_{out}=0$. When the measuring probe 73 is deflected from the center, the output voltage $U_{out}$ will change proportionately, and the phase will change by 180°.

The influence of the temperature on the stability of the output voltage $U_{out}$ can be eliminated, when the intermediate layer is made from an insulating material ($\dot{R}>>j\omega C$), and the relative permittivity ε of the insulating material has a negative temperature coefficient, when the measuring coil 2 has a positive temperature coefficient.

Figure 7B:
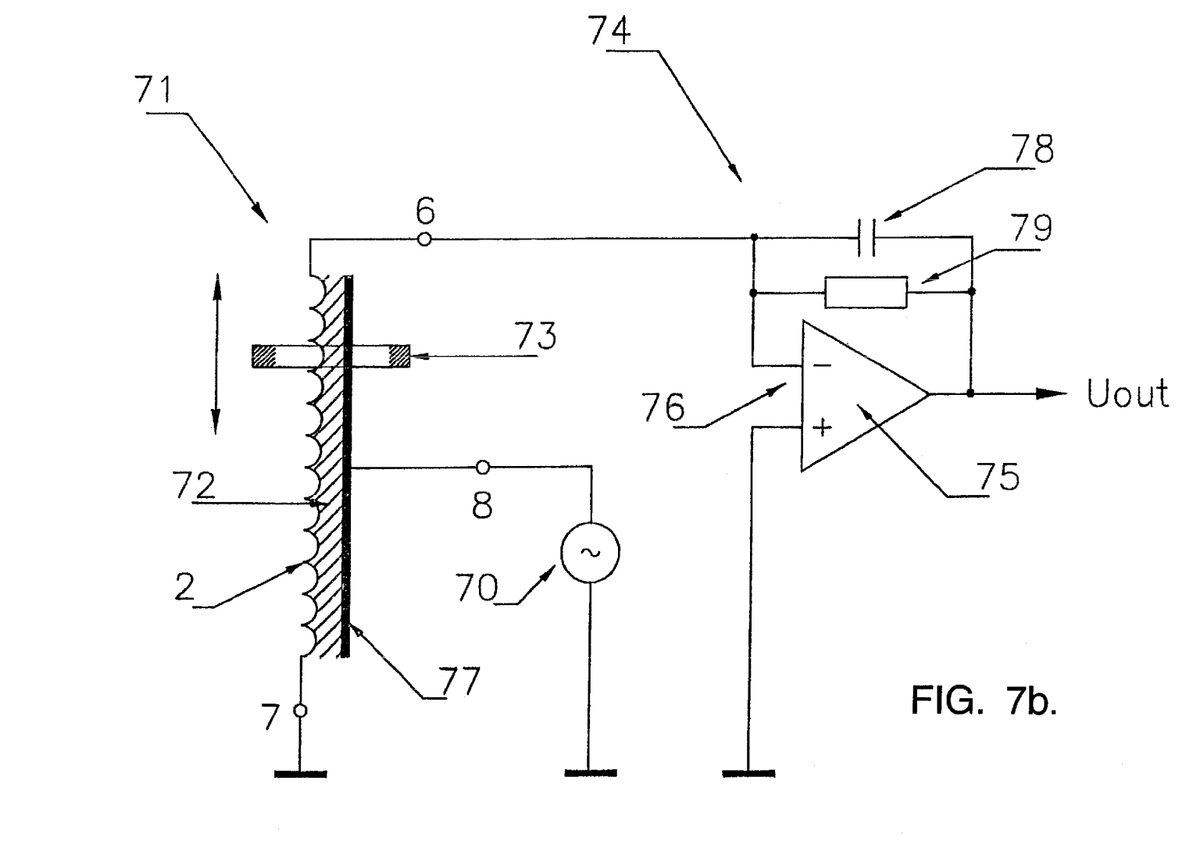
FIG. 7b shows an eddy current sensor of the present invention with a second evaluation circuit.

FIG. 7b shows the eddy current sensor 71 with a differently wired connection to the source of ac voltage 70 and evaluation circuit 74. In this embodiment, the exploring coil 2 connects with its output terminal 7 to ground and with its terminal 6 to evaluation circuit 74. The operation amplifier 75 connects with its noninverting input to ground, and generates at its output the evaluation signal $U_{out}$. The tap 8 of electrode 77 connects to the source of ac voltage. The intermediate layer 72 is made from an insulation material ($R>>j\omega C$). In this instance, the relative permittivity ε of the insulation material may have a positive temperature coefficient for compensating the temperature influence on the evaluation signal $U_{out}$.

Figure 7C:
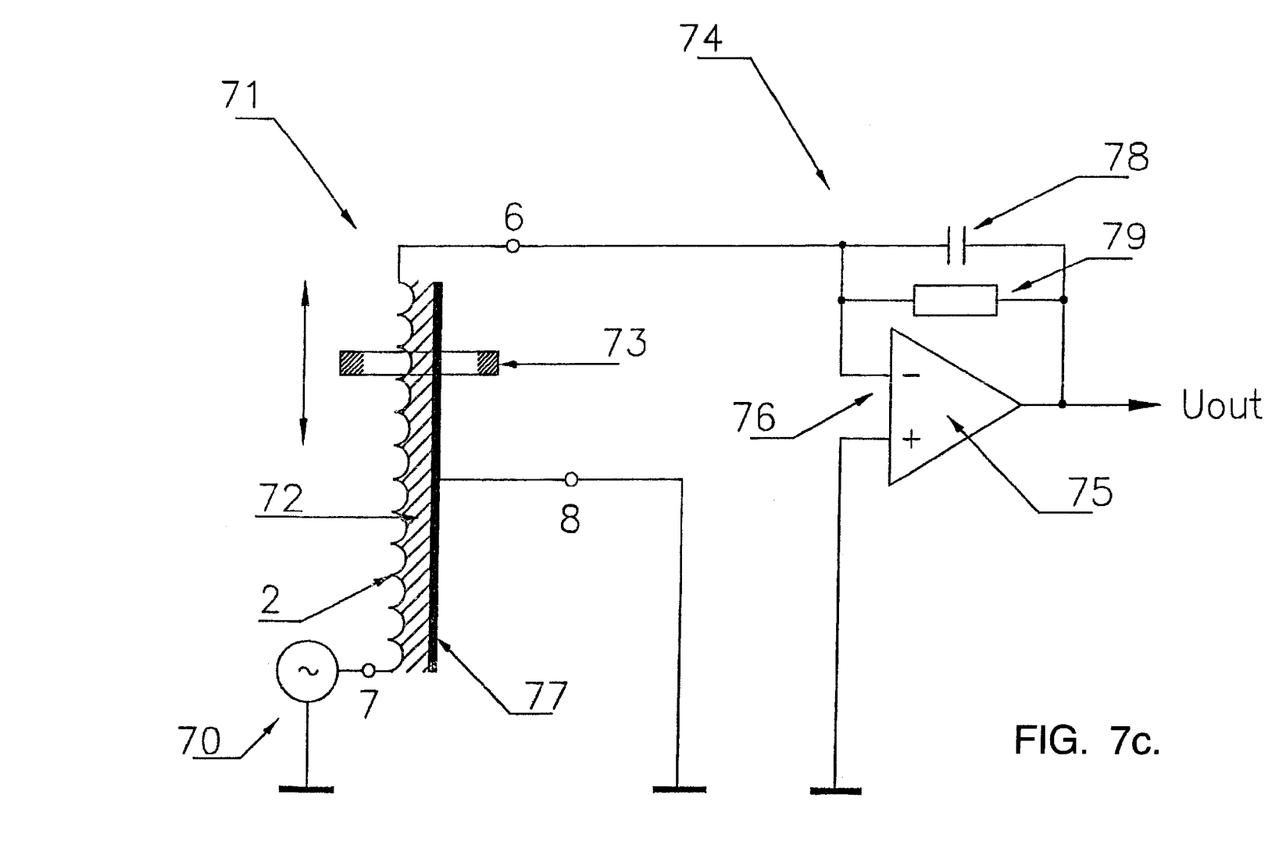
FIG. 7c shows an eddy current sensor of the present invention with a third evaluation circuit.

FIG. 7c shows a further wiring connecting of the eddy current sensor 71. In this case, the exploring coil 2 connects with its terminal 7 to the source of ac voltage 70, and with its terminal 6 to the evaluation circuit 74. The tap 8 of electrode 77 and the noninverting output of the operating amplifier 75 connect to ground. The evaluation signal $U_{out}$ reveals again the position of measuring probe 73. The two last-mentioned wiring connections of the eddy current sensor 71 permit realizing a current resonance at certain frequencies. This enables a maximum sensitivity, i.e., a maximum resolution of the evaluation signal $U_{out}$.

Figure 7D:
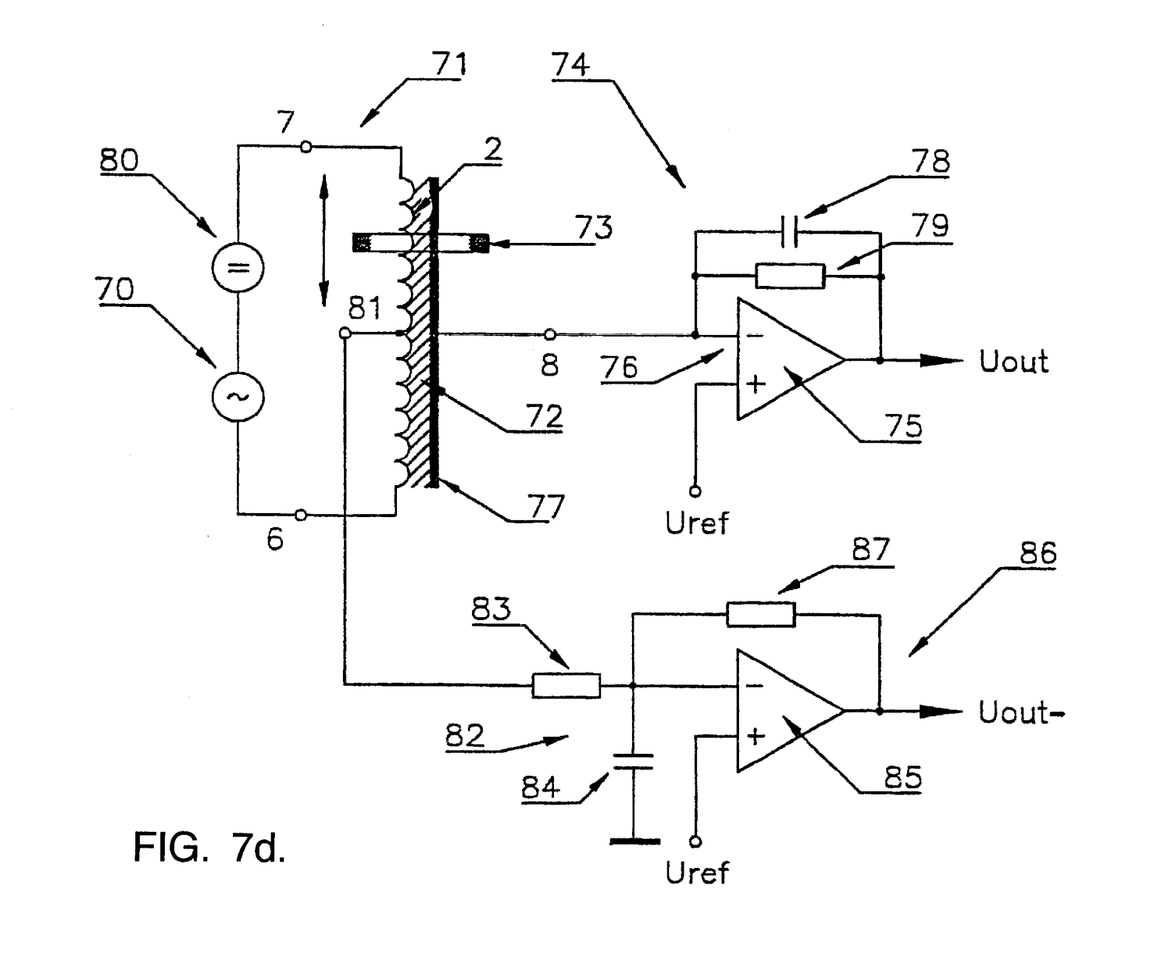
FIG. 7d shows an eddy current sensor of the present invention with a fourth evaluation circuit.

The eddy current sensor 71 of FIG. 7d connects with its terminals 6 and 7 to the source of ac voltage 70 and additionally to a source of dc voltage 80. The source of dc voltage may be poled as desired and be connectable and disconnectable. This causes the ac voltage of the source of ac voltage 70 to be superimposed with a dc voltage. However, the source of dc voltage 80 may also be connectable and disconnectable, so that a pulsed current is generated. The electrode 77 connects via its tap 8 to the previously described evaluation circuit 74, wherein the noninverting output of operation amplifier 75 is at the reference potential. The evaluation voltage $U_{out}$ can be generated by the operation amplifier 75 at its output. The exploring coil 2 comprises a center tap 81, which connects it, via a low-pass filter 82 that comprises at least one resistor 83 and one capacitor 84, to the operation amplifier 85 of evaluation circuit 86. The operation amplifier 85 is wired via a further resistor 87. The evaluation signal $U_{out}$-of the operation amplifier 85 (constant voltage) is proportional to the temperature gradient and independent of the position of measuring probe 73. The output signal $U_{out}$- of operation amplifier 85 may be subtracted from the evaluation signal $U_{out}$ of operation amplifier 75, which is proportional to the position change of measuring probe 73. Before the subtraction, the evaluation signal $U_{out}$-may be multiplied by a corresponding transmission factor. In this manner, it is possible to compensate temperature gradient influences especially simply and efficiently.

Figure 8:
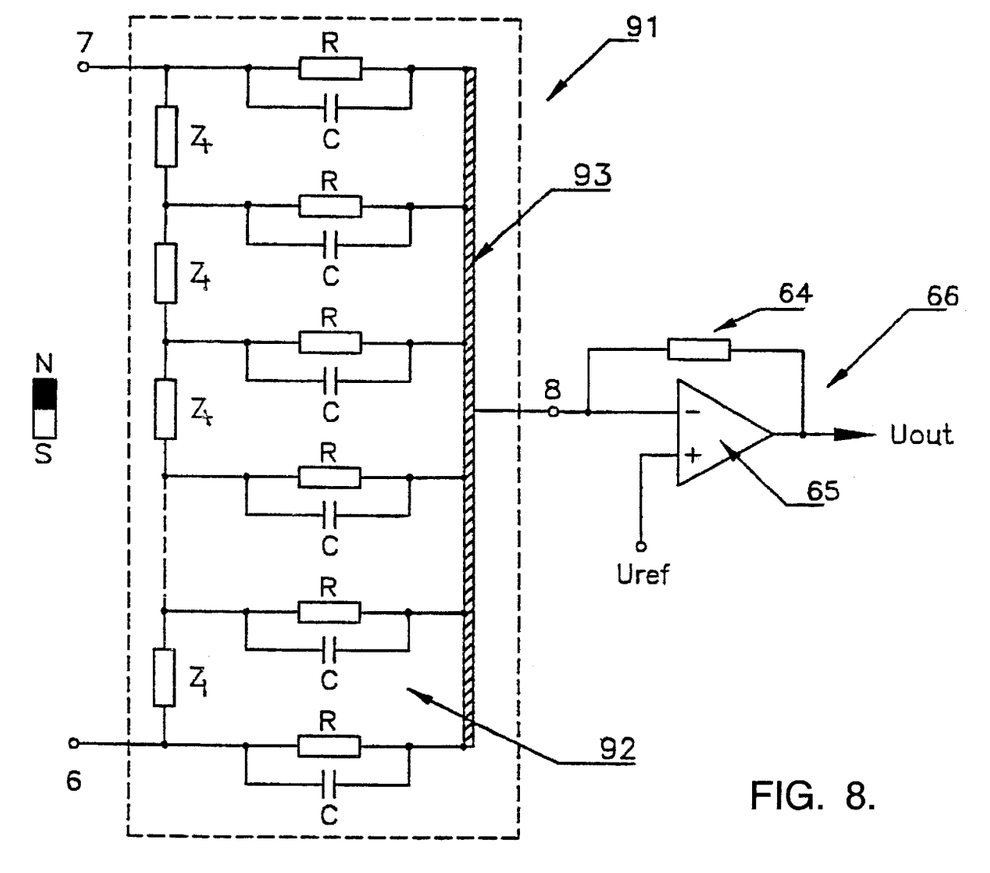
FIG. 8 shows a magnetoresistive eddy current sensor suitable for miniaturization.

FIG. 8 shows a magnetoresistive eddy current sensor that is suitable for miniaturization. The eddy current sensor 91 comprises an intermediate layer 92 and an electrode 93. The electrode 93 connects in a previously described manner, via tap 8, to the evaluation circuit 75, which generates the output signal $U_{out}$. As an alternative, it is possible to provide in the place of a magnetoresistive structure likewise a photoresistive structure for constructing the eddy current sensor 91. In this manner, it is possible to accommodate the eddy current sensor in a considerably reduced form on a chip, so that only little space is needed for the eddy current sensor 91.

What is claimed is:

1. Eddy current sensor comprising an exploring coil having windings wound on a coil form and two terminals, a source of ac voltage, an electrically,conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the coil form is constructed as said electrode and comprises a material with little electrical resistance.

2. The eddy current sensor of claim 1 wherein the electrode is designed and constructed as a conductor or printed circuit board and arranged parallel to the axis of exploring coil.

3. The eddy current sensor of claim 1 wherein the intermediate layer is an insulating layer of the winding wire of exploring coil.

4. The eddy current sensor of claim 1 wherein the electrical resistance of the intermediate layer has a negative or positive temperature coefficient.

5. The eddy current sensor of claim 1, wherein the measuring probe is arranged inside the coil form for displacement in a channel arranged parallel to the coil axis.

6. The eddy current sensor of claim 1, wherein the electrode, the intermediate layer, and the coil form are each aligned with their longitudinal axes parallel to the axis of the exploring coil, and/or where the deflection of the measuring probe occurs parallel to the axis of the measuring coil.

7. The eddy current sensor of claim 1, wherein the tap of the electrode connects to ground.

8. An eddy current sensor comprising an electrically conductive exploring coil which defines a length direction and includes two terminals, an electrode extending in the length direction adjacent the exploring coil, said electrode including a tap for enabling electrical contact, an intermediate electrically insulating layer positioned between the exploring coil and the electrode, an electrically conductive measuring probe having an annular configuration so as to at least partially surround the exploring coil and being mounted for movement along the length direction, a source of ac voltage connected to the two terminals of the exploring coil, and an evaluation circuit connected to the tap of the electrode for generating an output signal as a function of the position of the measuring probe along the length of the exploring coil.

9. The eddy current sensor of claim 8, wherein the exploring coil further includes a center tap, and the sensor further comprises an operation amplifier connected to the tenter tap.

10. An eddy current sensor comprising an electrically conductive exploring coil which defines a length direction and includes two terminals, an electrode extending in the length direction adjacent the exploring coil, said electrode including a tap for enabling electrical contact, an intermediate electrically insulating layer positioned between the exploring coil and the electrode, an electrically conductive measuring probe having an annular configuration so as to at least partially surround the exploring coil and being mounted for movement along the length direction, a source of ac voltage connected to one of the two terminals of the exploring coil or to the tap, and an evaluation circuit connected to the other of the two terminals of the exploring coil for generating an output signal as a function of the position of the measuring probe along the length of the exploring coil.

11. The eddy current sensor of claim 10, wherein the source of ac voltage is connected to the one of the two terminals of the exploring coil, and the other of the two terminals and the tap are connected to ground.

12. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the coil form forms an insulator, and further comprising a casing surrounding the exploring coil.

13. The eddy current sensor of claim 12, wherein the casing is made from a conductive, nonferromagnetic material.

14. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the electrical resistance value of the electrode is much smaller per unit of length than the impedance of the exploring coil per unit of length.

15. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the measuring probe is an electrically conductive ring surrounding the exploring coil.

16. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the coil form forms a closed ring or a tube, and where the measuring probe is supported for displacement along the ring or tube for detecting angular changes.

17. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein both terminals of the exploring coil connect to a source of ac voltage, and where the evaluation circuit comprises an operation amplifier, whose inverting input connects to the tap of the electrode.

18. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances, whose output signals are used to determine the position of measuring probe, and wherein between the tap of the electrode and a terminal of the exploring coil an ac voltage is applied, and where the second terminal of the exploring coil connects to an inverting input of an operation amplifier of the evaluation circuit.

19. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the exploring coil comprises a further terminal in the form of a center tap of the exploring coil, which connects via a low-pass filter to an inverting input of an operation amplifier.

20. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein the exploring coil comprises bare wires that are wound at a certain distance from one another.

21. Eddy current sensor comprising an exploring coil having windings wound on a coil form and two terminals, a source of ac voltage, an electrically conductive measuring probe, and an evaluation circuit, wherein the measuring probe is displaceable relative to the exploring coil, and the evaluation circuit generates an evaluation signal as a function of the position of measuring probe, and wherein the eddy current sensor further comprises an electrode with a tap for enabling electrical contact, the electrode forming together with the windings of the exploring coil and an intermediate electrically insulating layer a component with complex impedances whose output signals are used to determine the position of measuring probe, and wherein all components of the sensor are miniaturized on a chip, which comprises a magnetoresistive or photoresistive structure.

* * * * *

UNITED STATES PATENT AND TRADEMARK OFFICE
CERTIFICATE OF CORRECTION

PATENT NO.   : 6,462,536 B1
DATED        : October 8, 2002
INVENTOR(S)  : Mednikov et al.

It is certified that error appears in the above-identified patent and that said Letters Patent is hereby corrected as shown below:

<u>Title page, Item [54] and Column 1, line 1,</u>
After "SENSOR" insert -- WHICH IS CAPABLE OF MINIATURIZATION --.

<u>Column 7,</u>
Line 29, after "electrically" cancel the comma (,).

<u>Column 8,</u>
Line 16, "tenter" should read -- center --.

Signed and Sealed this

Fourth Day of February, 2003

JAMES E. ROGAN
*Director of the United States Patent and Trademark Office*